United States Patent
Buttolo et al.

(10) Patent No.: US 11,472,293 B2
(45) Date of Patent: Oct. 18, 2022

(54) IN-VEHICLE COMPONENT USER INTERFACE

(71) Applicant: FORD GLOBAL TECHNOLOGIES, LLC, Dearborn, MI (US)

(72) Inventors: Pietro Buttolo, Dearborn Heights, MI (US); James Stewart Rankin, II, Novi, MI (US); Dipanjan Ghosh, Livonia, MI (US); Gary Steven Strumolo, Canton, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 16/988,384

(22) Filed: Aug. 7, 2020

(65) Prior Publication Data

US 2020/0369153 A1  Nov. 26, 2020

Related U.S. Application Data

(62) Division of application No. 14/635,321, filed on Mar. 2, 2015, now abandoned.

(51) Int. Cl.
*B60K 35/00* (2006.01)
*B60K 37/06* (2006.01)
(52) U.S. Cl.
CPC .............. *B60K 35/00* (2013.01); *B60K 37/06* (2013.01); *B60K 2370/563* (2019.05);
(Continued)

(58) Field of Classification Search
None
See application file for complete search history.

(56) References Cited

U.S. PATENT DOCUMENTS

| | | |
|---|---|---|
| 4,721,954 A | 1/1988 | Mauch |
| 4,792,783 A | 12/1988 | Burgess et al. |

(Continued)

FOREIGN PATENT DOCUMENTS

| | | |
|---|---|---|
| CN | 103049053 A | 4/2013 |
| CN | 103092481 A | 5/2013 |

(Continued)

OTHER PUBLICATIONS

Rasin, "An In-Vehicle Human-Machine Interface Module," XML Journal, Jan. 3, 2003, (9 pages), retrieved from http://xml.sys-con.com/node/40547 on Dec. 13, 2014.

(Continued)

*Primary Examiner* — David P. Merlino
(74) *Attorney, Agent, or Firm* — Michael J. Spenner; Brooks Kushman P.C.

(57) ABSTRACT

A system may include an in-vehicle component, including a first control set to configure the component, configured to identify a device associated with a user approach to the component; and send an interaction request to the device to cause the device to display a user interface for the component including a second control set to configure the component, the second control set including at least one function unavailable in the first control set. A personal device may receive, from an in-vehicle component including a first control set to configure the component, a user interface definition descriptive of a second control set to configure the component; and receive, from the component, a request to display a user interface for the component including the second control set to configure the component, the second control set including at least one function unavailable in the first control set.

17 Claims, 6 Drawing Sheets

(52) U.S. Cl.
CPC .. *B60K 2370/566* (2019.05); *B60K 2370/569* (2019.05); *B60K 2370/573* (2019.05); *B60K 2370/589* (2019.05)

(56) References Cited

U.S. PATENT DOCUMENTS

| | | | |
|---|---|---|---|
| 4,962,302 A | 10/1990 | Katsumi | |
| 5,132,880 A | 7/1992 | Kawamura | |
| 5,143,437 A | 9/1992 | Matsuno et al. | |
| 5,255,442 A | 10/1993 | Schierbeek et al. | |
| 5,543,591 A | 8/1996 | Gillespie et al. | |
| 5,648,656 A | 7/1997 | Begemann et al. | |
| 5,650,929 A | 7/1997 | Potter et al. | |
| 5,697,844 A | 12/1997 | Von Kohorn | |
| 5,757,268 A | 5/1998 | Toffolo et al. | |
| 5,796,179 A | 8/1998 | Honaga | |
| 5,848,634 A | 12/1998 | Will et al. | |
| 5,850,174 A | 12/1998 | DiCroce et al. | |
| 6,028,537 A | 2/2000 | Suman et al. | |
| 6,377,860 B1 | 4/2002 | Gray et al. | |
| 6,397,249 B1 | 5/2002 | Cromer et al. | |
| 6,449,541 B1 | 9/2002 | Goldberg et al. | |
| 6,473,038 B2 | 10/2002 | Patwari et al. | |
| 6,536,928 B1 | 3/2003 | Hein et al. | |
| 6,935,763 B2 | 8/2005 | Mueller et al. | |
| 7,009,504 B1 | 3/2006 | Banter et al. | |
| 7,015,791 B2 | 3/2006 | Huntzicker | |
| 7,015,896 B2 | 3/2006 | Levy et al. | |
| 7,034,655 B2 | 4/2006 | Magner et al. | |
| 7,337,436 B2 | 2/2008 | Chu et al. | |
| 7,342,325 B2 | 3/2008 | Rhodes | |
| 7,502,620 B2 | 3/2009 | Morgan et al. | |
| 7,595,718 B2 | 9/2009 | Chen | |
| 7,647,562 B2 | 1/2010 | Ghercioiu et al. | |
| 7,672,757 B2 | 3/2010 | Hong et al. | |
| 7,706,740 B2 | 4/2010 | Collins et al. | |
| 7,778,651 B2 | 8/2010 | Billhartz | |
| 7,800,483 B2 | 9/2010 | Bucher | |
| 7,810,969 B2 | 10/2010 | Blackmore et al. | |
| 7,973,773 B2 | 7/2011 | Pryor | |
| 8,065,169 B1 | 11/2011 | Oldham et al. | |
| 8,073,589 B2 | 12/2011 | Rasin et al. | |
| 8,074,201 B2 | 12/2011 | Ghercioiu et al. | |
| 8,324,910 B2 | 12/2012 | Lamborghini et al. | |
| 8,344,850 B2 | 1/2013 | Girard, III et al. | |
| 8,401,589 B2 | 3/2013 | Liu et al. | |
| 8,408,766 B2 | 4/2013 | Wilson et al. | |
| 8,417,258 B2 | 4/2013 | Barnes, Jr. | |
| 8,421,589 B2 | 4/2013 | Sultan et al. | |
| 8,447,598 B2 | 5/2013 | Chutorash et al. | |
| 8,476,832 B2 | 7/2013 | Prodin et al. | |
| 8,482,430 B2 | 7/2013 | Szczerba | |
| 8,761,962 B2 | 6/2014 | Seok | |
| 8,768,565 B2 | 7/2014 | Jefferies et al. | |
| 8,797,295 B2 | 8/2014 | Bernstein et al. | |
| 8,823,517 B2 | 9/2014 | Hadsall, Sr. | |
| 8,831,514 B2 | 9/2014 | Fysowski | |
| 8,856,543 B2 | 10/2014 | Geiger et al. | |
| 8,866,604 B2 | 10/2014 | Rankin et al. | |
| 8,873,147 B1 | 10/2014 | Rhodes et al. | |
| 8,873,841 B2 | 10/2014 | Yang et al. | |
| 8,880,100 B2 | 11/2014 | Dobyns | |
| 8,930,045 B2 | 1/2015 | Oman et al. | |
| 8,947,202 B2 | 2/2015 | Tucker et al. | |
| 9,053,516 B2 | 6/2015 | Stempora | |
| 9,076,324 B2 | 7/2015 | Yashiro et al. | |
| 9,078,200 B2 | 7/2015 | Wuergler et al. | |
| 9,104,537 B1 | 8/2015 | Penilla et al. | |
| 9,164,588 B1 | 10/2015 | Johnson et al. | |
| 9,288,270 B1 | 3/2016 | Penilla et al. | |
| 9,348,492 B1* | 5/2016 | Penilla | G07C 5/008 |
| 9,350,809 B2 | 5/2016 | Leppanen | |
| 9,357,054 B1 | 5/2016 | Froment et al. | |
| 9,374,843 B2 | 6/2016 | Chu et al. | |
| 9,417,691 B2 | 8/2016 | Belimpasakis et al. | |
| 2002/0069002 A1 | 6/2002 | Morehouse | |
| 2002/0070923 A1 | 6/2002 | Levy et al. | |
| 2002/0087423 A1 | 7/2002 | Carbrey Palango et al. | |
| 2002/0092019 A1 | 7/2002 | Marcus | |
| 2002/0096572 A1 | 7/2002 | Chene et al. | |
| 2002/0178385 A1 | 11/2002 | Dent et al. | |
| 2002/0197976 A1 | 12/2002 | Liu et al. | |
| 2003/0078709 A1 | 4/2003 | Yester et al. | |
| 2003/0171863 A1 | 9/2003 | Plumeier et al. | |
| 2004/0034455 A1 | 2/2004 | Simonds et al. | |
| 2004/0076015 A1 | 4/2004 | Aoki et al. | |
| 2004/0141634 A1 | 7/2004 | Yamamoto et al. | |
| 2004/0215532 A1 | 10/2004 | Boman et al. | |
| 2005/0009469 A1 | 1/2005 | Kotola | |
| 2005/0017842 A1 | 1/2005 | Dematteo | |
| 2005/0040933 A1 | 2/2005 | Huntzicker | |
| 2005/0044906 A1 | 3/2005 | Spielman | |
| 2005/0099320 A1 | 5/2005 | Nath et al. | |
| 2005/0136845 A1 | 6/2005 | Masouka et al. | |
| 2005/0185399 A1 | 8/2005 | Beermann et al. | |
| 2005/0261807 A1 | 11/2005 | Sorensen et al. | |
| 2005/0261815 A1 | 11/2005 | Cowelchuk et al. | |
| 2005/0288837 A1 | 12/2005 | Wiegand et al. | |
| 2006/0075934 A1 | 4/2006 | Ram | |
| 2006/0089755 A1 | 4/2006 | Ampunan et al. | |
| 2006/0155429 A1 | 7/2006 | Boone et al. | |
| 2006/0155547 A1 | 7/2006 | Browne et al. | |
| 2006/0205456 A1 | 9/2006 | Bentz et al. | |
| 2006/0250217 A1 | 11/2006 | Hamling et al. | |
| 2006/0258377 A1 | 11/2006 | Economos et al. | |
| 2006/0271261 A1 | 11/2006 | Flores et al. | |
| 2007/0021885 A1 | 1/2007 | Soehren | |
| 2007/0140187 A1 | 6/2007 | Rokusek et al. | |
| 2007/0180503 A1 | 8/2007 | Li et al. | |
| 2007/0198472 A1 | 8/2007 | Simonds et al. | |
| 2007/0201389 A1 | 8/2007 | Murayama | |
| 2007/0262140 A1 | 11/2007 | Long, Sr. | |
| 2008/0140868 A1 | 6/2008 | Kalayjian et al. | |
| 2008/0180231 A1 | 7/2008 | Chen | |
| 2008/0261643 A1 | 10/2008 | Bauer et al. | |
| 2008/0278343 A1* | 11/2008 | Bauer | G08C 17/00 340/870.01 |
| 2008/0288406 A1 | 11/2008 | Seguin et al. | |
| 2009/0113961 A1 | 5/2009 | Muller | |
| 2009/0210110 A1 | 8/2009 | Dybalski et al. | |
| 2009/0249081 A1 | 10/2009 | Zayas | |
| 2009/0253439 A1 | 10/2009 | Gantner et al. | |
| 2010/0031344 A1 | 2/2010 | Zhao et al. | |
| 2010/0088029 A1* | 4/2010 | Hu | G01C 21/3664 455/41.3 |
| 2010/0091394 A1 | 4/2010 | DeWind et al. | |
| 2010/0171696 A1 | 7/2010 | Wu | |
| 2010/0176917 A1 | 7/2010 | Bacarella | |
| 2010/0197359 A1 | 8/2010 | Harris | |
| 2010/0216401 A1 | 8/2010 | Kitahara | |
| 2010/0222939 A1 | 9/2010 | Namburu et al. | |
| 2010/0225443 A1 | 9/2010 | Bayram et al. | |
| 2010/0231958 A1 | 9/2010 | Okigami | |
| 2010/0233957 A1 | 9/2010 | Dobosz | |
| 2010/0235045 A1 | 9/2010 | Craig et al. | |
| 2010/0280711 A1 | 11/2010 | Chen et al. | |
| 2010/0315373 A1 | 12/2010 | Steinhauser et al. | |
| 2011/0086668 A1 | 4/2011 | Patel | |
| 2011/0137520 A1 | 6/2011 | Rector et al. | |
| 2011/0148573 A1 | 6/2011 | Ghabra et al. | |
| 2011/0187496 A1 | 8/2011 | Denison et al. | |
| 2011/0199298 A1 | 8/2011 | Bassompiere et al. | |
| 2011/0219080 A1 | 9/2011 | McWithey et al. | |
| 2011/0264491 A1 | 10/2011 | Birnbaum et al. | |
| 2012/0006611 A1 | 1/2012 | Wallace et al. | |
| 2012/0032899 A1 | 2/2012 | Waeller et al. | |
| 2012/0065815 A1 | 3/2012 | Hess | |
| 2012/0096908 A1 | 4/2012 | Fuse | |
| 2012/0098768 A1 | 4/2012 | Bendewald et al. | |
| 2012/0109451 A1 | 5/2012 | Tan | |
| 2012/0136802 A1 | 5/2012 | McQuade et al. | |
| 2012/0154114 A1 | 6/2012 | Kawamura | |
| 2012/0214463 A1 | 8/2012 | Smith et al. | |
| 2012/0214471 A1 | 8/2012 | Tadayon et al. | |

(56) References Cited

U.S. PATENT DOCUMENTS

| | | |
|---|---|---|
| 2012/0229253 A1 | 9/2012 | Kolar |
| 2012/0244883 A1 | 9/2012 | Tibbitts et al. |
| 2012/0254809 A1 | 10/2012 | Yang et al. |
| 2012/0268235 A1 | 10/2012 | Farhan et al. |
| 2012/0268242 A1 | 10/2012 | Tieman et al. |
| 2013/0015951 A1 | 1/2013 | Kuramochi et al. |
| 2013/0017816 A1 | 1/2013 | Talty et al. |
| 2013/0037252 A1 | 2/2013 | Major et al. |
| 2013/0054095 A1 | 2/2013 | Suzuki et al. |
| 2013/0079951 A1 | 3/2013 | Brickman |
| 2013/0099892 A1 | 4/2013 | Tucker et al. |
| 2013/0116012 A1 | 5/2013 | Okayasu |
| 2013/0218371 A1 | 8/2013 | Simard et al. |
| 2013/0227647 A1 | 8/2013 | Thomas et al. |
| 2013/0259232 A1 | 10/2013 | Petel |
| 2013/0261871 A1 | 10/2013 | Hobbs et al. |
| 2013/0283202 A1 | 10/2013 | Zhou et al. |
| 2013/0295908 A1 | 11/2013 | Zeinstra et al. |
| 2013/0300608 A1 | 11/2013 | Margalef et al. |
| 2013/0329111 A1 | 12/2013 | Desai et al. |
| 2013/0335222 A1 | 12/2013 | Comerford et al. |
| 2013/0342379 A1 | 12/2013 | Bauman et al. |
| 2014/0043152 A1 | 2/2014 | Lippman et al. |
| 2014/0068713 A1 | 3/2014 | Nicholson et al. |
| 2014/0121883 A1 | 5/2014 | Shen et al. |
| 2014/0129051 A1 | 5/2014 | Gautama et al. |
| 2014/0139454 A1 | 5/2014 | Mistry et al. |
| 2014/0142783 A1 | 5/2014 | Grimm et al. |
| 2014/0163774 A1 | 6/2014 | Demeniuk |
| 2014/0164559 A1 | 6/2014 | Demeniuk |
| 2014/0188348 A1 | 7/2014 | Guatama et al. |
| 2014/0200736 A1 | 7/2014 | Silvester |
| 2014/0212002 A1 | 7/2014 | Curcio et al. |
| 2014/0213287 A1 | 7/2014 | MacDonald et al. |
| 2014/0215120 A1 | 7/2014 | Saylor et al. |
| 2014/0226303 A1 | 8/2014 | Pasdar |
| 2014/0258727 A1 | 9/2014 | Schmit et al. |
| 2014/0277935 A1 | 9/2014 | Daman et al. |
| 2014/0279744 A1 | 9/2014 | Evans |
| 2014/0309806 A1 | 10/2014 | Ricci |
| 2014/0309879 A1 | 10/2014 | Ricci |
| 2014/0321321 A1 | 10/2014 | Knaappila |
| 2014/0335902 A1 | 11/2014 | Guba et al. |
| 2014/0365073 A1 | 12/2014 | Stanek et al. |
| 2014/0375477 A1 | 12/2014 | Jain et al. |
| 2014/0379175 A1 | 12/2014 | Mittermeier |
| 2014/0380442 A1 | 12/2014 | Addepalli et al. |
| 2015/0039877 A1 | 2/2015 | Hall et al. |
| 2015/0048927 A1 | 2/2015 | Simmons |
| 2015/0057839 A1 | 2/2015 | Chang et al. |
| 2015/0094088 A1 | 4/2015 | Chen |
| 2015/0116085 A1 | 4/2015 | Juzswik |
| 2015/0116100 A1 | 4/2015 | Yang et al. |
| 2015/0123762 A1 | 5/2015 | Park et al. |
| 2015/0126171 A1 | 5/2015 | Miller et al. |
| 2015/0147974 A1 | 5/2015 | Tucker et al. |
| 2015/0148018 A1 | 5/2015 | Rose et al. |
| 2015/0148990 A1 | 5/2015 | Patel |
| 2015/0149042 A1 | 5/2015 | Cooper et al. |
| 2015/0154531 A1 | 6/2015 | Skaaksrud |
| 2015/0172902 A1 | 6/2015 | Kasslin et al. |
| 2015/0178034 A1 | 6/2015 | Penilla et al. |
| 2015/0180710 A1 | 6/2015 | Cazanas et al. |
| 2015/0181014 A1 | 6/2015 | Gerhardt et al. |
| 2015/0195669 A1 | 7/2015 | Grover et al. |
| 2015/0204965 A1 | 7/2015 | Magarida et al. |
| 2015/0210287 A1 | 7/2015 | Penilla et al. |
| 2015/0223151 A1 | 8/2015 | Lei et al. |
| 2015/0256668 A1 | 9/2015 | Atkinson et al. |
| 2015/0261219 A1 | 9/2015 | Cuddihy et al. |
| 2015/0261573 A1 | 9/2015 | Rausch et al. |
| 2015/0269797 A1 | 9/2015 | Kauffmann et al. |
| 2015/0278164 A1 | 10/2015 | Kim et al. |
| 2015/0283914 A1 | 10/2015 | Malone |
| 2015/0294518 A1 | 10/2015 | Peplin et al. |
| 2015/0332530 A1 | 11/2015 | Kishita |
| 2015/0352953 A1 | 12/2015 | Koravadi |
| 2015/0356797 A1 | 12/2015 | McBride et al. |
| 2015/0382160 A1 | 12/2015 | Slay, Jr. et al. |
| 2016/0039430 A1 | 2/2016 | Ricci |
| 2016/0055699 A1 | 2/2016 | Vincenti |
| 2016/0119782 A1 | 4/2016 | Kim |
| 2016/0133072 A1 | 5/2016 | Santavicca |
| 2016/0182548 A1 | 6/2016 | Ghabra et al. |
| 2016/0203661 A1 | 7/2016 | Pudar et al. |
| 2016/0214572 A1 | 7/2016 | Snider |
| 2016/0248905 A1 | 8/2016 | Miller et al. |
| 2016/0320469 A1 | 11/2016 | Laifenfeld et al. |
| 2016/0332535 A1 | 11/2016 | Bradley et al. |
| 2016/0360382 A1 | 12/2016 | Gross et al. |
| 2017/0103327 A1* | 4/2017 | Penilla ............... G06Q 30/0207 |
| 2017/0297518 A1 | 10/2017 | Hatton et al. |
| 2017/0313426 A1 | 11/2017 | Morin |

FOREIGN PATENT DOCUMENTS

| | | |
|---|---|---|
| CN | 103218044 A | 7/2013 |
| CN | 103342117 A | 10/2013 |
| CN | 103373301 A | 10/2013 |
| CN | 102445954 B | 3/2014 |
| CN | 103780702 A | 5/2014 |
| CN | 103942963 A | 7/2014 |
| CN | 104007893 A | 8/2014 |
| CN | 104007929 A | 8/2014 |
| CN | 104580784 A | 4/2015 |
| CN | 104742833 A | 7/2015 |
| CN | 104750056 A | 7/2015 |
| JP | 2011131833 A | 7/2011 |
| WO | 2013074866 A1 | 5/2013 |
| WO | 2013052043 A1 | 11/2013 |
| WO | 2014152357 A1 | 9/2014 |
| WO | 2015103605 A1 | 7/2015 |

OTHER PUBLICATIONS

Shahzada, "Touch Interaction for User Authentication," Thesis, Carleton University, Ottawa, Ontario, May 2014 (124 pages).

Napa Sae-Bae et al., "Biometric-Rich Gestures: A Novel Approach to Authentication on Multi-touch Devices," NYU-Poly, CHI 2012, May 5-10, 2012, Austin, TX (10 pages).

Services-Bluetooth Development Portal, last accessed May 30, 2015, https://developer.bluetooth.org/gatt/services/Pages/ServicesHome.aspx. (1 page).

Azad, "The Quick Guide to GUIDs," Better Explained—Math insights that click, last accessed May 24, 2015, http://betterexplained.com/articles (15 pages).

Goodwin, "Add-on module auto-unlocks your car when your phone is near," CNET, Car Tech, Nov. 19, 2013, http://www cnet.com/news/add-on-module-auto-unlocks-your-car-when-your-phone-is-near (2 pages).

Hertz 24/7, "Book. Unlock. Go. You can reserve your vehicle anywhere, anytime—up to 10 days in advance," last accessed Jul. 28, 2015, https://www.hertz247.com/parkridge/en-us/About (3 pages).

Klosowski, "Unlock Your Car with a Bluetooth Powered Keyless Entry System," Lifehacker, Sep. 30, 2013, http://lifehacker.com/unlock-your-car-with-a-bluetooth-powered-keyless-entry-1427088798 (2 pages).

Toyota, Toyota Prius C Brochure, 2015, available at http://www.toyota.com/priusc/ebrochure.

Thomas, "2010 Toyota Prius Touch Tracer Display," Mar. 3, 2009, available at https://www.cars.com/articles/2009/03/2010-toyota-prius-touch-tracer-display/.

Gahran, "Vehicle owner's manuals—now on smartphones," CNN.com, Jan. 31, 2011, available at http://www.cnn.com/2011/TECH/mobile/01/31/car.manual.phone/.

Specification of the Bluetooth System, Version 4.2, "Master Table of Contents & Compliance Requirements," Dec. 2, 2014, https://www.bluetooth.or/en-us/specification/adopted-specifications. (2,772 pages).

(56) References Cited

OTHER PUBLICATIONS

General Motors Corporation; Pontiac GTO Owner's Manual; 2005; pp. 3-19 and 3-20; https://my.gm.com/content/dam/gmownercenter/gmna/dynamic/manuals/2006/pontiac/gto/2006_gto_owners.pdf.

Bargshady et al., Precise Tracking of Things via Hybrid 3-D Fingerprint Database and Kernel Method Particle Filter, 2016, IEEE, p. 8963-8971.

Murugappan et al., Wireless EEG Signals based Neuromarketing System using Fast Fourier Transform (FFT), 2014, IEEE, p. 25-30.

Katoh et al., A Method of Advertisement Selection in Multiple RFID-Tags Sensor Network for a Ubiquitous Wide-Area Advertising Service, 2008, IEEE, p. 519-524.

* cited by examiner

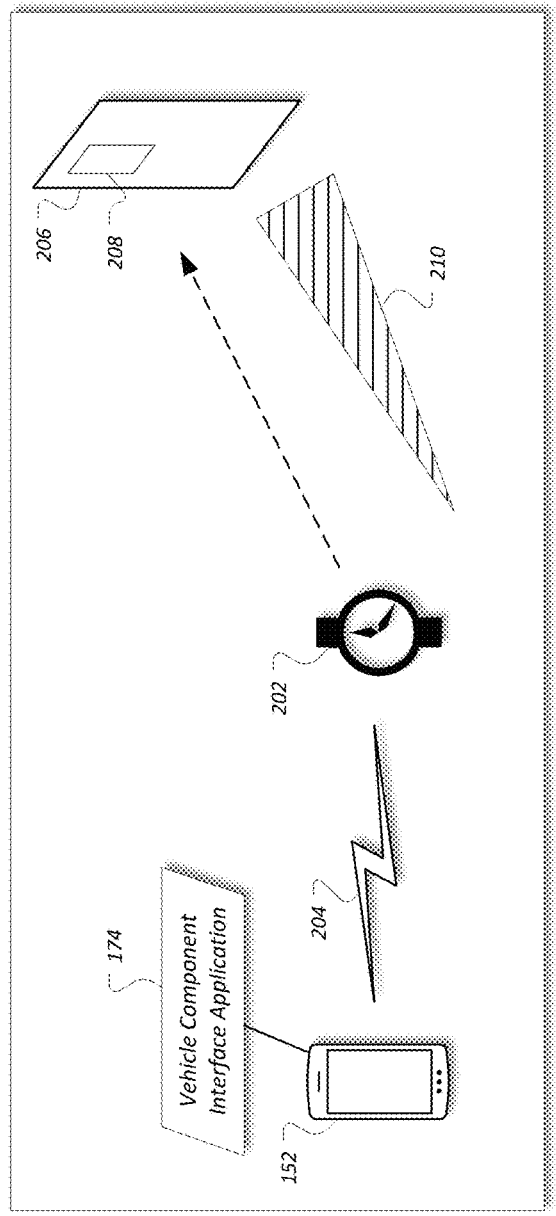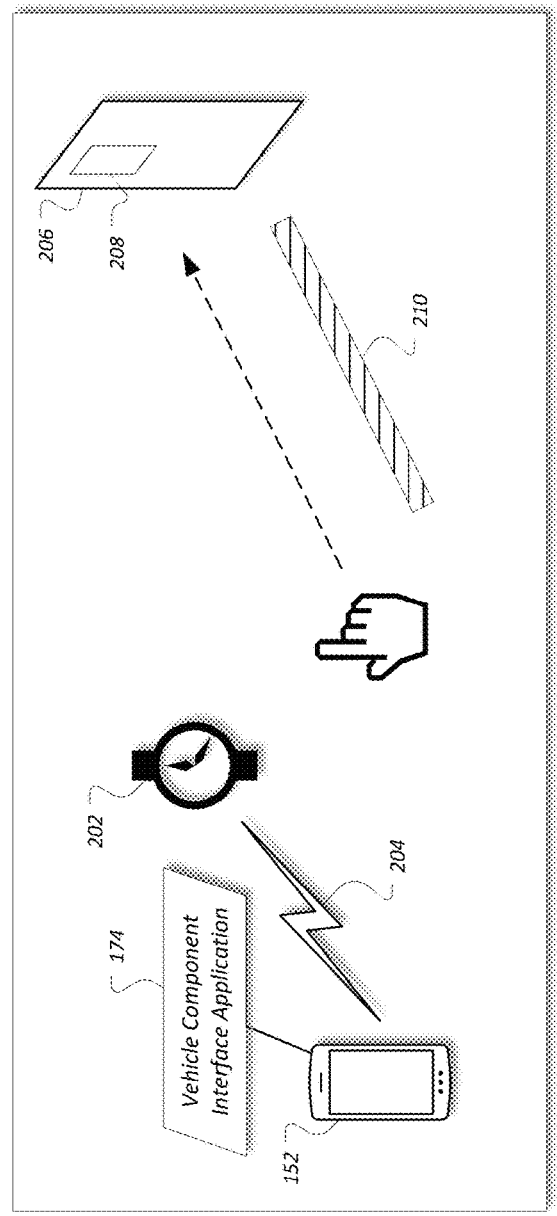

IN-VEHICLE COMPONENT USER INTERFACE

CROSS-REFERENCE TO RELATED APPLICATIONS

This application is a division of U.S. application Ser. No. 14/635,321 filed Mar. 2, 2015, now abandoned, the disclosure of which is hereby incorporated in its entirety by reference herein.

TECHNICAL FIELD

Aspects of the disclosure generally relate to deployment of a user interface for interior vehicle component configuration by way of a personal user device.

BACKGROUND

Smartphone and wearable device sales volumes continue to increase. Thus, more such devices are brought by users into the automotive context. Smartphones can already be used in some vehicle models to access a wide range of vehicle information, to start the vehicle, and to open windows and doors. Additionally, some wearable devices are capable of providing real-time navigation information to the driver.

SUMMARY

In a first illustrative embodiment, a system includes an in-vehicle component, including a first control set to configure the component, configured to identify a device associated with a user approach to the component; and send an interaction request to the device to cause the device to display a user interface for the component including a second control set to configure the component, the second control set including at least one function unavailable in the first control set.

In a second illustrative embodiment, a personal device is configured to receive, from an in-vehicle component including a first control set to configure the component, a user interface definition descriptive of a second control set to configure the component; and receive, from the component, a request to display a user interface for the component including the second control set to configure the component, the second control set including at least one function unavailable in the first control set In a third illustrative embodiment, a computer-implemented method includes receiving, by a personal device from an in-vehicle component including a first control set to configure the component, a user interface definition descriptive of a second control set to configure the component; and receiving, from the component, a request to display a user interface for the component including the second control set to configure the component, the second control set including at least one function unavailable in the first control set.

BRIEF DESCRIPTION OF THE DRAWINGS

FIG. 2A illustrates a diagram of a request by a user to configure an in-vehicle component via the user's mobile device;

FIG. 2B illustrates an alternate diagram of a request by a user to configure an in-vehicle component via the user's mobile device;

DETAILED DESCRIPTION

Figure 1:
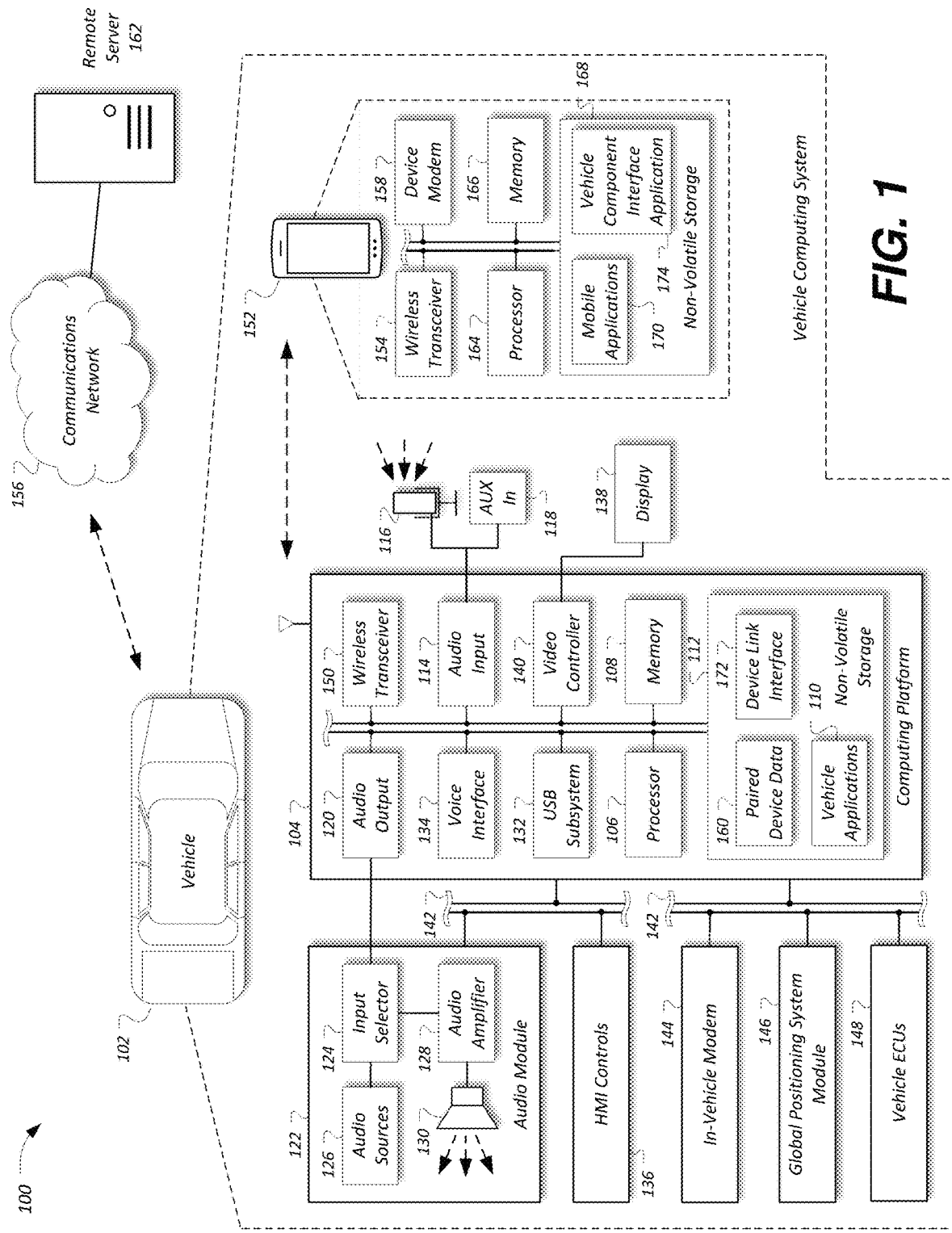
FIG. 1 illustrates an example diagram of a system that may be used to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A system may be configured to allow vehicle occupants to seamlessly interact with their vehicle or with any other framework-enabled vehicle. The system may include a vehicle configured to detect a user approach to a proximity sensor of an in-vehicle component to be configured, and further to identify a personal device of the approaching user on which to display a user interface for the in-vehicle component. As used herein, a personal device may generally refer to a mobile device such as a smartphone, or a wearable device such as a smart watch or smart glasses. The personal device of the user may be configured to communicate with the vehicle to receive the user interface to display, provide the user interface to the user, and forward any commands entered via the user interface to the vehicle for configuration of the in-vehicle component. It should be noted that the user interaction with the in-vehicle component may be performed despite the personal device not having been paired with or being in communication with the vehicle head unit. Thus, the system may be configured to determine which occupant of the vehicle desires to interact with a specific function, i.e., which device should interact with the in-vehicle component to be configured, and further to communicate, to the identified device, which user interface information is to be displayed.

In an example, a user may reach for a light switch within the vehicle cabin, e.g., located on the vehicle headliner near a lamp or on a seat armrest. When the light switch is touched by the user, it may provide some basic functionality to allow for the configuration of the light, such as turning the light off or on. Moreover, as the user approaches the light switch, his or her mobile device may be configured to automatically display a more in-depth interface for the light switch. The in-depth user interface may accordingly enable the user to setup additional lighting features, such as tone, mood, intensity, etc., which may be unavailable via the direct physical user interface of the light.

In another example, a user may request a taxi, a shared car, or another type of public transportation vehicle. As the user enters the vehicle, the user may desire to perform customization to the local experience within the vehicle by adjusting lighting, climate, and sound attributes for the user's seat location. The user may also desire to be made aware of the specific features of the user's seat, such as whether the seat has cooling or massage features or some other feature available. If such features are available, the user may wish to be able to craft a customized experience without having to learn a vehicle-specific or application-specific user interface. Accordingly, when the user approaches one of the controls of the vehicle to configure, the vehicle may be configured to provide a user interface definition to the user's personal device including the specifics of the particular vehicle control.

In yet another example, the user may perform the same customization on a first vehicle, and may desire that the user's vehicle settings would automatically be applied to a second vehicle supporting the customizations in which the user may travel. For example, the user's personal device may maintain lighting, climate, infotainment, and seat position settings from the first vehicle, and may attempt to set user defaults accordingly based on the available features of the second vehicle. Further aspects of the system are discussed in detail below.

FIG. 1 illustrates an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternatively, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case such the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As exampled in detail below, an appropriate mobile device 152 to display the vehicle component interface application 174 may be identified, and a definition of the user interface to display may be provided to the identified vehicle component interface application 174 for display to the user.

Systems such as the system 100 described above may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device 202 to have been paired with or be in communication with the computing platform 104.

FIG. 2A illustrate a diagram 200-A of a request by a user to configure an in-vehicle component 206 via the user's mobile device 152. As shown in FIG. 2A, a wearable device 202 associated with the user's mobile device 152 being moved toward an in-vehicle component 206 having a proximity sensor 208.

The wearable device 202 may include a smartwatch, smart glasses, fitness band, control ring, or other personal mobility or accessory device designed to be worn and to communicate with the user's mobile device 152. In an example, the wearable device 202 may communicate data with the mobile device 152 over a wireless connection 204. The wireless connection 204 may be a Bluetooth Low Energy (BLE) connection, but other types of local wireless connection, such as Wi-Fi or Zigbee may be utilized as well. Using the connection 204, the mobile device 152 may provide access to one or more control or display functions of the mobile device 152 to the wearable device 202. For example, the mobile device 152 may enable the wearable device 202 to accept a phone call to the mobile device 152, enable a mobile application of the mobile device 152 to execute, receive and present notifications sent to the mobile device 152, and/or a combination thereof.

Figure 3:
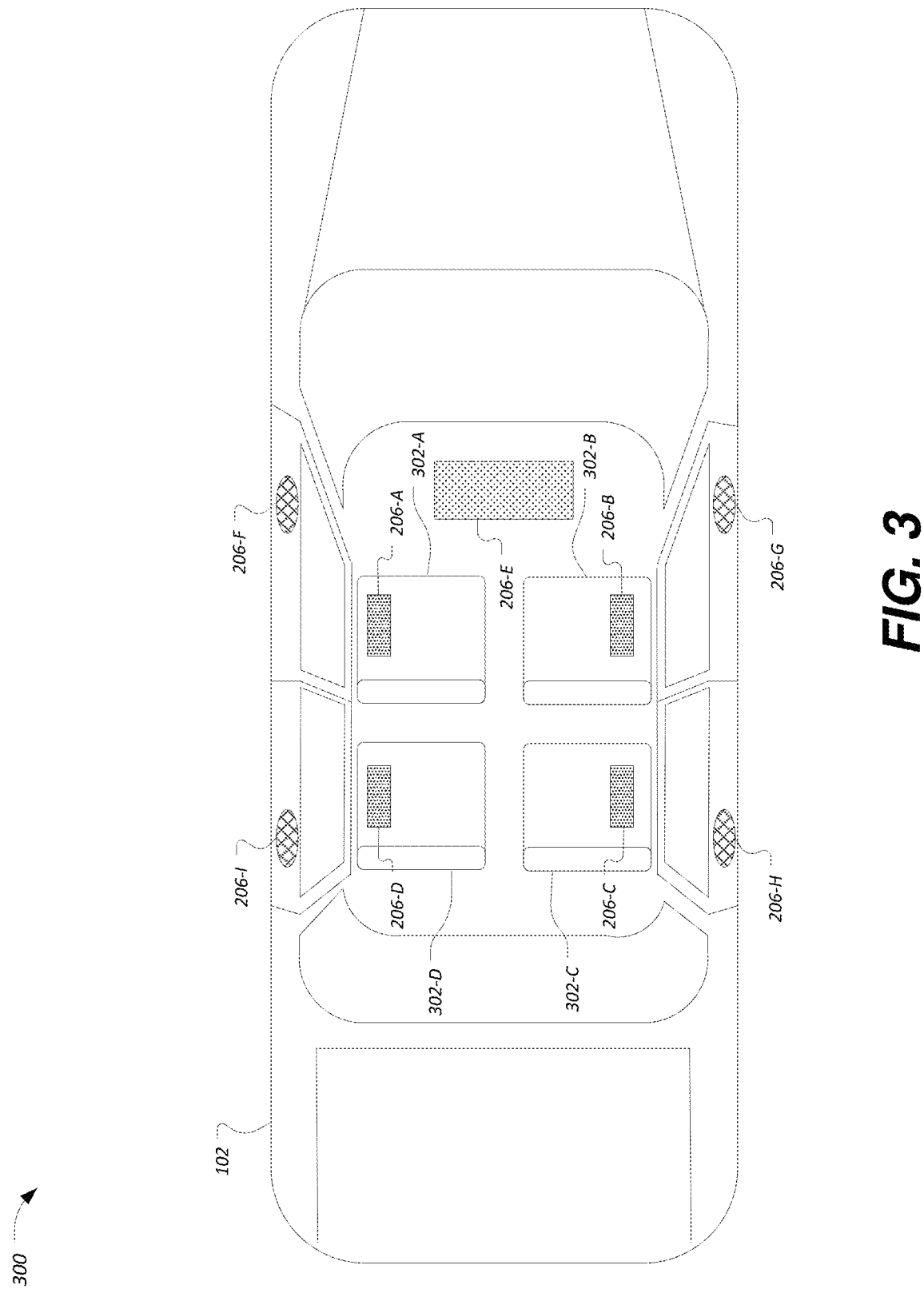
FIG. 3 illustrates an example vehicle including a plurality of in-vehicle components and a plurality of vehicle seats from which the in-vehicle components are accessible.

The in-vehicle component 206 may include various elements of the vehicle 102 having user-specific configurable settings. As shown in FIG. 3, an example vehicle 102 includes a plurality of in-vehicle components 206-A through 206-I (collectively 206) and a plurality of vehicle seats 302-A through 302-D (collectively 302) from which the in-vehicle components 206 are accessible. These in-vehicle components 206 may include, as some examples, overhead light in-vehicle components 206-A through 206-D, overhead compartment in-vehicle component 206-E, and speaker in-vehicle components 206-F through 206-I. Other examples of in-vehicle components 206 are possible as well, such as power seats or climate control vents. In many cases, the in-vehicle component 206 may expose controls such as buttons, sliders, and touchscreens that may be used by the user to configure the particular settings of the in-vehicle component 206. As some possibilities, the controls of the in-vehicle component 206 may allow the user to set a lighting level of a light control, set a temperature of a climate control, set a volume and source of audio for a speaker, and set a position of a seat control. It should be noted that the illustrated portion of the vehicle 102 in FIG. 3 is merely an example, and more, fewer, and/or differently located elements may be used.

Referring back to FIG. 2A, each in-vehicle component 206 may be equipped with a proximity detection sensor 208 configured to facilitate detection of the wearable device 202. In an example, the proximity detection sensor 208 may include a wireless device, such as an Apple iBeacon device or a Google altBeacon device configured to enable low energy Bluetooth signal intensity as a locator, to determine the proximity of the wearable device 202 or mobile device 152. Detection of proximity of the wearable device 202 or mobile device 152 by the proximity detection sensor 208 may cause the vehicle component interface application 174 of the mobile device 152 to be activated. In an example, a wearer of the wearable device 202 may reach his or her hand toward the in-vehicle component 206. As the wireless signal intensity 210 of the approaching wearable device 202 to the proximity detection sensor 208 crosses a minimum threshold intensity, the intensity shift of the wireless connection 204 strength may be detected by the proximity detection sensor 208, and a handshake may be established between the proximity detection sensor 208 and the approaching wearable device 202. This connection functionality of the mobile device 152 may accordingly be utilized as a trigger to invoke the vehicle component interface application 174 on the mobile device 152.

As another possibility, the proximity detection sensor 208 may include a near field communication (NFC) tag that may be detected by the wearable device 202 or mobile device 152. Accordingly, as the wearable device 202 or mobile device 152 is moved into proximity to the in-vehicle component 206, the vehicle component interface application 174 on the mobile device 152 may be activated. However, the use of NFC tags may require a controlled, slow motion of the approaching device to close proximity to the proximity detection sensor 208. As a further possibility, the proximity detection sensor 208 may include a static image such as a quick response (QR) code or other information-encoded image that may be captured via a camera of the wearable device 202 or mobile device 152. In such a case, the vehicle component interface application 174 on the mobile device 152 may be activated responsive to the user pointing a camera of the wearable device 202 or mobile device 152 at the QR code or other image. The use of QR codes or other image representations may require the approaching device to keep its camera on, and further requires the user to orient the approaching device to acquire the image.

In general, each in-vehicle component 206 may include a set of controls configured to receive input from the user with respect to basic or core functions of the in-vehicle component 206 (e.g., turn light on/off, turn speaker on/off, etc.), and a proximity detection sensor 208 configured to identify proximity of wearable device 202 or mobile device 152. It should be noted that the user interaction with the in-vehicle component 206 may be performed despite the mobile device 152 or wearable device 202 not having been paired with or being in communication with the computing platform 104.

FIG. 2B illustrates an alternate diagram 200-B of a request by a user to configure an in-vehicle component 206 via the user's mobile device 152. As compared to the diagram 200-A, in the diagram 200-B the user is approaching and may touch the proximity detection sensor 208 of the in-vehicle component 206 with a "naked" hand, i.e., a hand that is not wearing a wearable device 202 or holding a mobile device 152. Thus, as no increase in wireless signal intensity 210 is available to be detected, the vehicle 102 may be unable to detect which device to utilize based on the wireless signal intensity 210. In such a situation, instructing all mobile devices 152 in the vehicle 102 to launch the vehicle component interface application 174 or sending to all of them a notification that the interface is available would be an inelegant solution.

Instead, triangulation may be used to detect which mobile device 152 is that of the passenger requesting interaction with the in-vehicle component 206. Referring again to FIG. 3, if a user located in seat 302-B reaches for the overhead light in-vehicle component 206-B, by triangulation the vehicle 102 may determine that a mobile device 152 located in seat 302-B is the device of the user in proximity to the in-vehicle component 206-B. As shown in FIG. 3, each of the in-vehicle controls 206-A through 206-D is located closest to one of the seats 302-A through 302-D, respectively. Additionally, similar to as shown in FIGS. 2A and 2B, each of the in-vehicle controls 206-A through 206-D includes a respective proximity sensor 208.

Figure 4A:
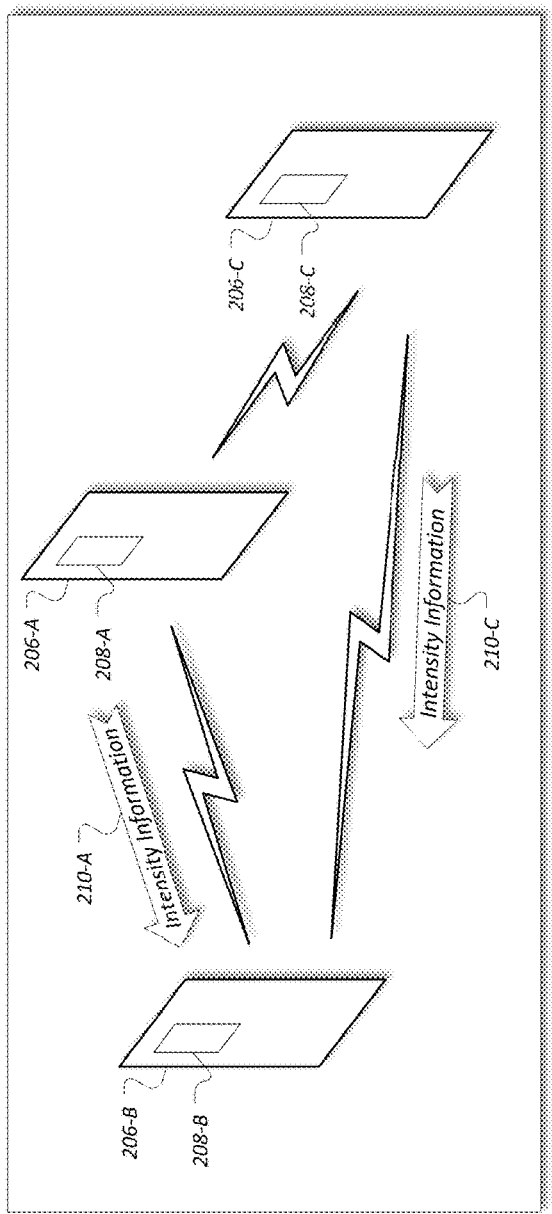
FIG. 4A illustrates an example in-vehicle component receiving wireless signal intensity data from other in-vehicle components.

In the example in which a proximity sensor 208 of the in-vehicle component 206 detects an approach or touch of the user's hand to the in-vehicle component 206, a preliminary action may be performed by the in-vehicle component 206, such as toggling the on-off state of a light of the in-vehicle component 206. Additionally or alternately, as shown in FIG. 4A, the in-vehicle component 206-B may broadcast or otherwise send a request for intensity information 210 to the other in-vehicle components 206 of the vehicle 102 (e.g., 206-A and 206-C as illustrated). This request may cause the other in-vehicle components 206 to return wireless signal intensity 210 data identified by their respective proximity sensors 208 for whatever devices they detect (e.g., intensity data 210-A identified by the proximity sensor 308-A, intensity data 210-C identified by the proximity sensor 208-C).

Continuing with the example of the user in seat 302-B approaching the in-vehicle component 206-B, the in-vehicle component 206-B may user the wireless signal intensity 210-B from its own proximity sensor 308-B as well as data from the other proximity sensors 208 (e.g., proximity sensors 208-A and 208-C) to determine a mobile device 152 of the approaching user. Thus, the proximity detection sensors 208 may be configured to share device wireless signal intensity 210 data with one other to allow for triangulation and identification of which of the wearable devices 202 or mobile devices 152 are closest to a given in-vehicle component 206.

For instance, a mobile device 152 may be detected as being the only mobile device 102 that has a highest measured wireless signal intensity 210 at the in-vehicle component 206-B as compared to that measured at the in-vehicle component 206-A and the in-vehicle component 206-C. That device may therefore be determined to be the mobile device 152 most likely located in seat 302-B. Notably, such an approach facilitates device identification despite the various devices potentially having different baseline signal intensities, since the triangulation relies on differences in relative wireless signal intensity 210 levels for each device as measured by the various proximity sensors 208 of the in-vehicle components 206, not on a determination of which device has a highest overall intensity level at one particular proximity sensor 208.

In some examples, the proximity detection sensors 208 may additionally be utilized to enable in-cabin gesture interfaces for users wearing capable wearable devices 202 (e.g., BLE devices in the case of BLE proximity detection sensors 208), such as one of the new smart-watches, fitness bands or control rings. Based on the aforementioned triangulation techniques, the network of proximity detection sensors 208 may be able to perform in-cabin location tracking of the wearable devices 202, in order to detect a gesture action performed by a user in the air, such as to open a window with a simple swipe of the hand, or to control the volume with an up-down hand motion.

The in-cabin tracking may also be extended to passengers not wearing wearable devices 202. In an example, electrical field distortions may be measurable with sufficiently sensitive proximity detection sensors 208 based on the field generated by the wireless components inside the vehicle 102. If different communication technologies are used, such as 60 GHz modulation, in addition to increasing the bandwidth of data communicable between devices, in some cases the vehicle 102 may be able to detect in-cabin tracking to detect gestures and other motions at a high resolution.

The integration of proximity detection sensors 208 with the configurable in-vehicle components 206, as well as the triangulation method or wireless signal intensity 210 threshold techniques, may accordingly allow the vehicle 102 to determine which mobile device 152 belongs to the user engaging the configurable in-vehicle component 206.

Figure 4B:
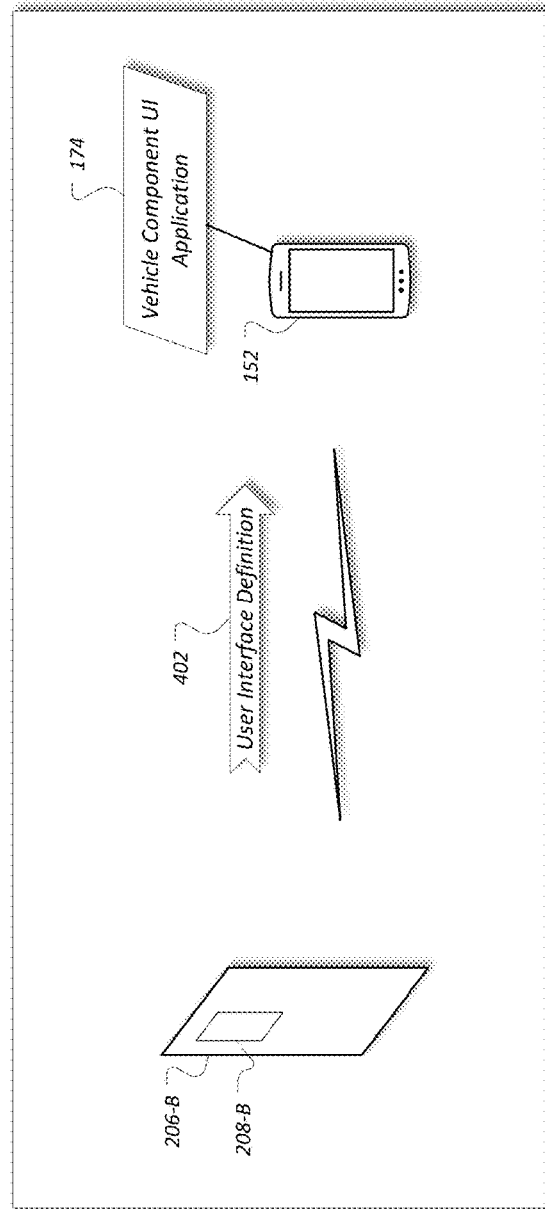
FIG. 4B illustrates an example in-vehicle component the in-vehicle component providing the identified mobile device with a user interface definition.

As shown in FIG. 4B, once the mobile device 152 of the requesting user is identified, the vehicle 102 may be configured to provide the identified mobile device 152 with a user interface definition 402 regarding what functionality is available to perform on the in-vehicle component 206. In an example, to keep the in-vehicle component 206 functionality self-contained, the in-vehicle component 206 may be configured to communicate the user interface definition 402 to the mobile devices 152 or wearable devices 202 identified to display the user interface.

To provide the interface specified by the user interface definition 402 on the located mobile device 152, in an example, the in-vehicle component 206 may be configured to request the mobile device 152 to launch a vehicle component interface application 174 previously installed to the mobile device 152. If the vehicle component interface application 174 is not already installed on the personal device, the in-vehicle component 206 may be configured to offer to side-load to it or to offer a link from which the in-vehicle component 206 may be installed to the personal device (e.g., from the Google Application Store or the Apple AppStore, as some possibilities).

The interface definition 402 may be encoded in a data interchange format, such as hypertext markup language (HTML), extensible markup language (XML) or JavaScript Object Notation (JSON). As one specific example, the user interface definition 402 may be encoded in a markup similar to that of the view and viewgroup user interface definitions utilized by the Google Android operating system. One advantage of using a data exchange commonly used on the web is that user devices (e.g., mobile devices 152, wearable devices 202, etc.) may be able to render the user interface definition 402 to display the user interface using existing or downloadable functionality of the device (e.g., a web browser plugin).

As one possibility, responsive to a user entering the vehicle 102, a personal device of the user may be configured to utilize the vehicle component interface application 174 to connect to the vehicle 102 to receive the user interface definition 402. In an example, the personal device may connect to the in-vehicle components 206 to receive the user interface definition 402 via available wireless protocols (e.g., BLE, etc.) provided by the proximity sensors 208. The received user interface definition 402 may be descriptive of the functions available in each in-vehicle component 206, variables that may be controlled, and current state of the variables. Thus, as the vehicle component interface application 174 may retrieve the user interface definition 402 descriptive of the user interface to present from the vehicle 102, a universal vehicle component interface application 174 may be utilized across various brands/makes/models of vehicle 102.

In an example, an user interface definition 402 template for an in-vehicle light fixture having a single lamp may be described as an XML element with two attributes as follows:
<Lighting
  intensity_max="100"
  color_tone_max="360"/>

For a more complex interface, a more complex user interface definition 402 template would accordingly be utilized, such as that used to control seat functions (e.g., forward, back, tilt, recline, lumbar, etc.). In such an example, the user interface definition 402 template may be defined to include attributes descriptive of the available functions, their names for presentation in the user interface, their allowed range of values (e.g., min, max, step size, default, etc.), and potentially layout information descriptive of grouping, ordering, or suggested controls (e.g., toggle control, slider control, knob control, etc.) of how to render the interface controls to change these attributes.

As the mobile device 152 or wearable device 202 is requested by the in-vehicle component 206 to act as a user interface for the in-vehicle component 206, the mobile device 152 or wearable device 202 accordingly receives functionalities are available from the module, but also what other modules offering similar functionalities are available in the vehicle as well as their locations (e.g., from triangulation as discussed above). The vehicle component interface application 174 may be configured to aggregate the data and offer to the user combinations for controlling interior lighting or other vehicle functions by controlling the in-vehicle component 206 sharing that attribute. As a specific example, the user may utilize their mobile device 152 to invoke interior lights of all interior lights, but at a low intensity level. It should be noted that in other examples, aggregation of the user interface definition 402 may be performed by the in-vehicle components 206, such that the aggregated user interface definition 402 may be communicated to the personal device by the specific in-vehicle component 206 requesting for the user's device to display a user interface.

Figure 5:
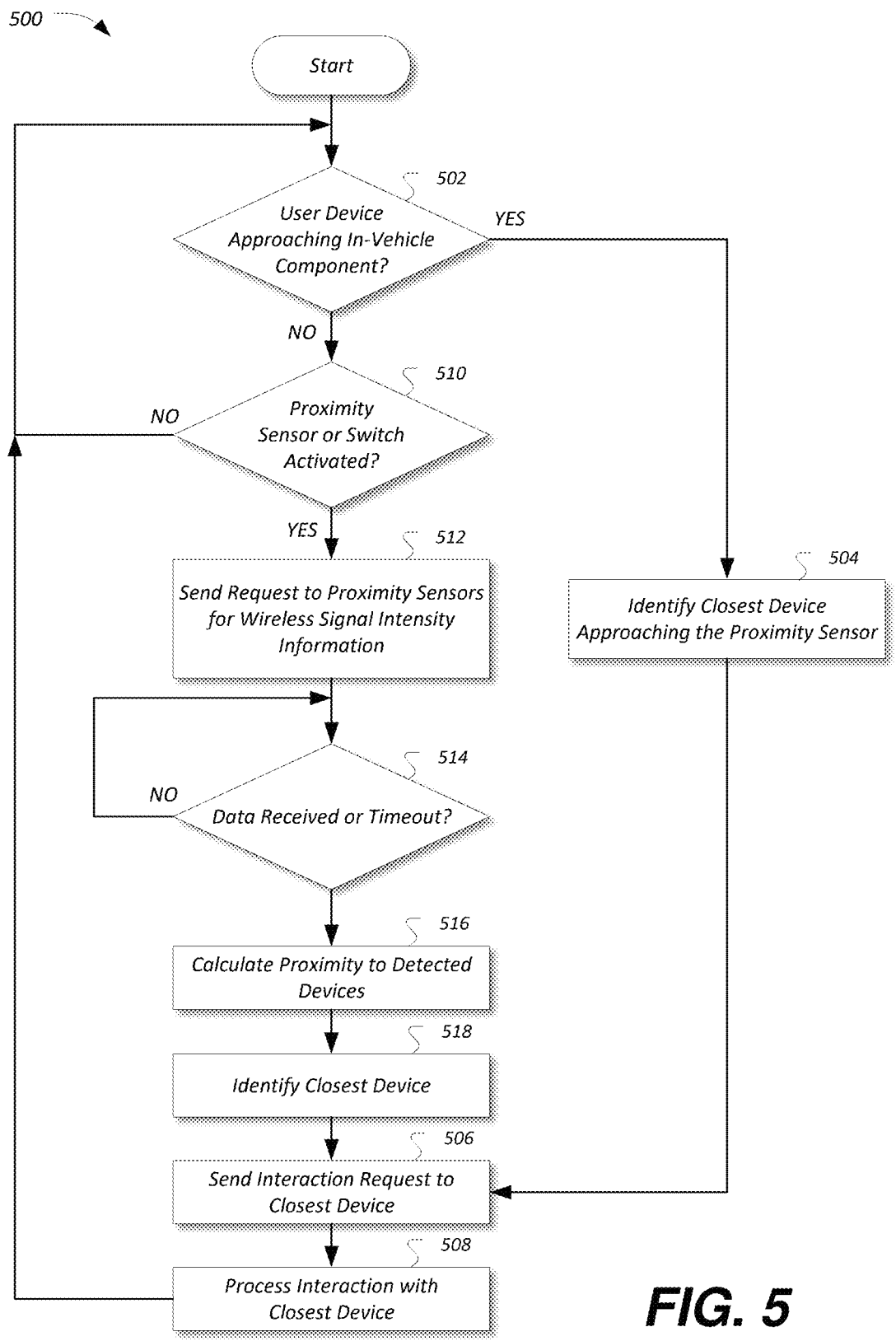
FIG. 5 illustrates an example process for identifying a mobile device associated with a user in the vehicle requesting an action.

FIG. 5 illustrates an example process 500 for identifying a mobile device 152 associated with a user in the vehicle 102 requesting an action. The process 500 may be performed, for example, by one or more in-vehicle components 206 of the vehicle 102.

At operation 502, the in-vehicle component 206 determines whether a personal device of a user (e.g., a mobile device 152, a wearable device 202, etc.) is approaching the in-vehicle component 206. In an example, the in-vehicle component 206 may be equipped with a proximity detection sensor 208 configured to facilitate detection of a wearable device 202, such that as the wireless signal intensity 210 of the approaching wearable device 202 to the proximity detection sensor 208 crosses a minimum threshold intensity, the intensity shift of the wireless connection 204 strength may be detected by the proximity detection sensor 208, and a handshake may be established between the proximity detection sensor 208 and the approaching wearable device 202. If a personal device is detected as approaching the in-vehicle component 206, control passes to operation 504. Otherwise, control passes to operation 510.

At operation 504, the in-vehicle component 206 identifies the mobile device 152 of the user to use to display a user interface for the in-vehicle component 206. In an example, the approaching wearable device 202 may be paired with or otherwise associated with a mobile device 152 configured to execute the vehicle component interface application 174, and the wearable device 202 may be configured to provide to the in-vehicle component 206 (or the in-vehicle component 206 may request) the identity of the associated mobile device 152. In another example, if the approaching device is a mobile device 152 or other device configured to execute the vehicle component interface application 174, then the in-vehicle component 206 may identify the approaching mobile device 152 as the device to display the user interface.

At operation 506, the in-vehicle component 206 sends an interaction request to the identified device. In an example the in-vehicle component 206 may be configured to request the identified device to launch a vehicle component interface application 174, or to provide a link for the vehicle component interface application 174 to be downloaded if the vehicle component interface application 174 is not yet installed. Once invoked or installed, control passes to operation 508.

At operation 508, the in-vehicle component 206 processes the interaction request using the identified device. An example interaction is described below with respect to the process 600. After operation 508, control passes to operation 502.

At operation 510, the in-vehicle component 206 may determine whether the in-vehicle component 206 detects an approach but no personal device. In an example, electrical field distortions of the in-vehicle component 206 may be measured by the proximity detection sensor 208 of the in-vehicle component 206 based on the field generated by the wireless components inside the vehicle 102. In another example, the in-vehicle component 206 may detect a user touch via a selection of a control of the built-in user interface of the in-vehicle component 206. If an approach is detected control passes to operation 512. Otherwise, control passes to operation 502.

At operation 512, the in-vehicle component 206 requests the other in-vehicle components 206 of the vehicle 102 to send wireless signal intensity 210 data identified by their respective proximity sensors 208 for whatever devices they detect. This may be done to allow the in-vehicle component 206 to perform triangulation to detect which mobile device 152 is that of the user requesting interaction with the in-vehicle component 206.

At operation 514, the in-vehicle component 206 determines whether the wireless signal intensity 210 data or whether a timeout occurred. For example, if at least a predetermined amount of time has passed since sending the request in operation 502, control passes to operation 516. Or, if the in-vehicle component 206 receives the requested wireless signal intensity 210, control passes to operation 516. Otherwise, control remains at operation 514.

At operation 516, the in-vehicle component 206 calculates proximity to the detected devices. In an example, the in-vehicle component 206 may use the received wireless signal intensities 210 from its proximity sensor 308 as well as data from the other proximity sensors 208, to determine which devices have what wireless signal intensities 210 at the various in-vehicle component 206.

At operation 518, the in-vehicle component 206 identifies a closest device. In an example, in-vehicle component 206 may identify a mobile device 152 having a higher wireless signal intensity 210 by in-vehicle component 206 than by the other in-vehicle components 206. This device may accordingly be identified as being the most likely the mobile device 152 of the user approaching the in-vehicle component 206. After operation 518, control passes to operation 506.

Figure 6:
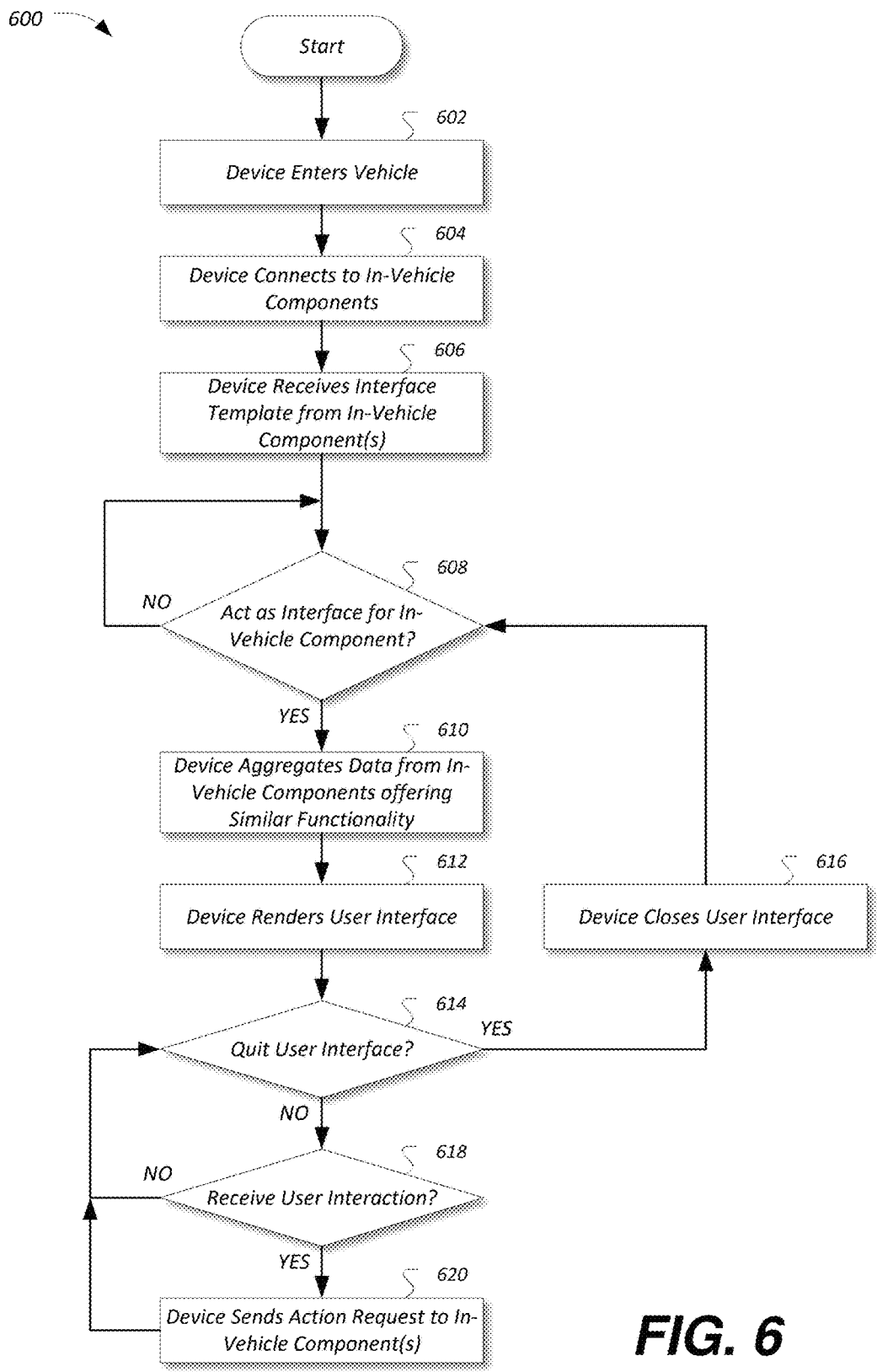
FIG. 6 illustrates an example process for displaying a user interface on the identified mobile device.

FIG. 6 illustrates an example process 600 for displaying a user interface on the identified mobile device 152. The process 600 may be performed, for example, by a personal device (e.g., a mobile device 152, a wearable device 202, etc.) in communication with one or more in-vehicle components 206 of the vehicle 102.

At operation 602, the personal device enters the vehicle 102. In an example, the personal device may be carried by a user entering the vehicle 102.

At operation 604, the personal device connects to the in-vehicle components 206. In an example, responsive to a user entering the vehicle 102, a personal device of the user may be configured to utilize the vehicle component interface application 174 to connect to the available wireless protocols (e.g., BLE, etc.).

At operation 606, the personal device receives complex user interface definition 402 template information from the in-vehicle components 206. In an example, the personal device may receive tagged user interface definition 402 information descriptive of the functions available in each in-vehicle component 206, variables that may be controlled, and current state of the variables.

At operation 608, the personal device determines whether to act as a user interface for the in-vehicle components 206. In an example, such as the process 500 discussed above, the personal device may be requested by the in-vehicle component 206 to act as a user interface for the in-vehicle component 206.

At operation 610, the personal device aggregates data from the in-vehicle components 206 offering similar functionality. In an example, the user may utilize their mobile device 152 to invoke interior lights of all interior lights, but at a low intensity level. It should be noted that in other examples, aggregation of the user interface definition 402 may be performed by the in-vehicle components 206, such that the aggregated user interface definition 402 may be communicated to the personal device by the specific in-vehicle component 206 requesting for the user's device to display a user interface.

At operation 612, the personal device renders a user interface. The personal device may accordingly display a user interface defined according to the received and aggregated tagged user interface definition 402.

At operation 614, the personal device determines whether the user requests to quit the user interface. In an example, the personal device may receive user input requesting for the user interface to be dismissed. If such input is received, control passes to operation 616. Otherwise, control passes to operation 618.

At operation 616, the personal device closes the user interface. After operation 616, control passes to operation 608.

At operation 618, the personal device determines whether a user interaction with the user interface is received. In an example, the personal device may receive user input requesting for a change to be made to the settings for one or more of the in-vehicle components 206.

At operation 620, the personal device sends an action request to the in-vehicle component(s) 206. In an example, the user may utilize the personal device to invoke interior lights of all interior lights, but at a low intensity level. After operation 620, control passes to operation 614.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a personal device, configured to
        receive, from a first in-vehicle component having a first control set to configure the first in-vehicle component, a first user interface definition descriptive of a second control set to configure the first in-vehicle component, the second control set defining first attributes descriptive of first available control functions of the first in-vehicle component, the first attributes defining at least one configurable aspect of the first in-vehicle component unavailable in the first control set;
        receive, from a second in-vehicle component including a third control set to configure the second in-vehicle component, a second user interface definition descriptive of a fourth control set to configure the second in-vehicle component, the fourth control set of the second in-vehicle component defining second attributes descriptive of second available control functions of the second in-vehicle component, the second attributes defining at least one configurable aspect of the second in-vehicle component unavailable in the third control set of the second in-vehicle component;
        aggregate the first user interface definition and the second user interface definition to combine, in a user interface, functions in common between the first user interface definition and the second user interface definition into combined functions that control both the first in-vehicle component and the second in-vehicle component; and
        display the user interface including the combined functions.

2. The system of claim 1, wherein the personal device is further configured to:
    receive a user interaction to the user interface requesting one of the functions in common; and
    send a request to the first in-vehicle component and to the second in-vehicle component to perform the one of the functions in common.

3. The system of claim 1, wherein the personal device is further configured to request the first user interface definition descriptive of the second control set from the first in-vehicle component, responsive to connection of the personal device to the first in-vehicle component.

4. The system of claim 1, wherein the personal device is further configured to display the user interface responsive to a user approach detected according to an increasing wireless signal intensity of the personal device.

5. The system of claim 1, wherein the personal device is further configured to display the user interface responsive to a user approach detected according to an increasing wireless signal intensity of a wearable device paired to the personal device.

6. The system of claim 1, wherein the personal device is further configured to display the user interface responsive to one of a touch sensor and a proximity sensor, despite no increasing wireless signal intensity from the personal device or a wearable device.

7. The system of claim 1, wherein the first and second user interface definitions are encoded using at least one of: (i) hypertext markup language (HTML), (ii) extensible markup language (XML), (iii) JavaScript Object Notation (JSON), and (iv) view and viewgroup user interface definitions.

8. The system of claim 1, wherein the first user interface definition includes at least four of: (i) the first attributes descriptive of the first available control functions, (ii) names for presentation of the first attributes of the first available control functions in the user interface, (iii) allowed ranges of values for the first attributes, (iv) layout information descriptive of grouping and ordering of the first available control functions, or (v) suggested controls to use to display the first available control functions in the user interface.

9. The system of claim 1, wherein the first control set includes an on/off switch for a function, and the first attributes defining the at least one configurable aspect of the first in-vehicle component unavailable in the first control set include a variable intensity control between on and off for the function.

10. A computer-implemented method comprising:
receiving, by a personal device from a first in-vehicle component including a first control set to configure the first in-vehicle component, a first user interface definition descriptive of a second control set to configure the first in-vehicle component, the second control set defining first attributes descriptive of available control functions of the first in-vehicle component, the first attributes defining at least one configurable aspect of the first in-vehicle component unavailable in the first control set; and
receiving, by the personal device from a second in-vehicle component including a third control set to configure the second in-vehicle component, a second user interface definition descriptive of a fourth control set to configure the second in-vehicle component, the fourth control set of the second in-vehicle component defining second attributes descriptive of second available control functions of the second in-vehicle component, the second attributes defining at least one configurable aspect of the second in-vehicle component unavailable in the third control set of the second in-vehicle component;
aggregating the first user interface definition and the second user interface definition to combine, in a user interface, functions in common between the first user interface definition and the second user interface definition into combined functions that control both the first in-vehicle component and the second in-vehicle component; and
displaying the user interface including the combined functions.

11. The method of claim 10, further comprising:
receiving a user interaction to the user interface requesting one of the combined functions; and
sending a request to the first in-vehicle component and to the second in-vehicle component to perform the one of the combined functions.

12. The method of claim 10, further comprising requesting the first user interface definition descriptive of the second control set from the first in-vehicle component, responsive to connection of the personal device to the first in-vehicle component.

13. The method of claim 10, wherein the first user interface definition is encoded in extensible markup language (XML).

14. A non-transitory computer readable medium comprising instructions that, when executed by a processor of a personal device, cause the personal device to perform operations including to:

receive, from a first in-vehicle component including a first control set to configure the in-vehicle component, a first user interface definition descriptive of a second control set to configure the first in-vehicle component, the second control set of the first in-vehicle component defining first attributes descriptive of available control functions of the first in-vehicle component, the first attributes defining at least one configurable aspect of the first in-vehicle component unavailable in the first control set of the first in-vehicle component;
receive, from a second in-vehicle component including a third control set to configure the second in-vehicle component, a second user interface definition descriptive of a fourth control set to configure the second in-vehicle component, the fourth control set of the second in-vehicle component defining second attributes descriptive of available control functions of the second in-vehicle component, the second attributes defining at least one configurable aspect of the second in-vehicle component unavailable in the third control set of the second in-vehicle component;
aggregate the first user interface definition and the second user interface definition to combine, in a user interface, functions in common between the first user interface definition and the second user interface definition into combined functions that control both the first in-vehicle component and the second in-vehicle component;
receive, from the first in-vehicle component, a request to display the user interface for the first in-vehicle component including the second control set to configure the first in-vehicle component, the second control set including at least one function unavailable in the first control set;
display the user interface;
receive a user interaction to the user interface requesting one of the combined functions; and
send a request to the first in-vehicle component and to the second in-vehicle component to perform the one of the combined functions.

15. The medium of claim 14, wherein the one of the combined functions includes a combination function to control an attribute shared by the first in-vehicle component and the second in-vehicle component.

16. The medium of claim 15, wherein the combination function collectively controls a lighting intensity function of the first in-vehicle component and of the second in-vehicle component.

17. The medium of claim 15, wherein the combined functions are aggregated based on the first attributes and the second attributes controlling the same available control functions.

* * * * *